(12) United States Patent
Kim et al.

(10) Patent No.: US 12,117,640 B2
(45) Date of Patent: Oct. 15, 2024

(54) OPTICAL FILM

(71) Applicant: LMS Co., Ltd., Pyeongtaek-si (KR)

(72) Inventors: Jinhwan Kim, Pyeongtaek-si (KR);
Sungsik Cho, Pyeongtaek-si (KR);
Juhyuk Yim, Pyeongtaek-si (KR)

(73) Assignee: LMS CO., LTD., Pyeongtaek-si (KR)

( * ) Notice: Subject to any disclaimer, the term of this patent is extended or adjusted under 35 U.S.C. 154(b) by 0 days.

(21) Appl. No.: 17/519,027

(22) Filed: Nov. 4, 2021

(65) Prior Publication Data

US 2022/0163716 A1    May 26, 2022

(30) Foreign Application Priority Data

Nov. 5, 2020    (KR) .................. 10-2020-0147107

(51) Int. Cl.
| | | |
|---|---|---|
| *F21V 8/00* | (2006.01) | |
| *G02B 5/02* | (2006.01) | |
| *G02F 1/1335* | (2006.01) | |
| *G02F 1/13357* | (2006.01) | |

(52) U.S. Cl.
CPC ......... *G02B 6/0053* (2013.01); *G02B 5/0242* (2013.01); *G02B 6/0051* (2013.01); *G02F 1/133606* (2013.01); *G02F 1/133607* (2021.01)

(58) Field of Classification Search
CPC .. G02B 6/0053; G02B 5/0242; G02B 6/0051; G02F 1/133607
See application file for complete search history.

(56) References Cited

U.S. PATENT DOCUMENTS

| | | | | |
|---|---|---|---|---|
| 2002/0097358 | A1* | 7/2002 | Ueki ................. | G02F 1/133504 349/113 |
| 2004/0141103 | A1* | 7/2004 | Kotchick .............. | B29C 65/086 349/61 |
| 2006/0033859 | A1* | 2/2006 | Yun ................... | G02F 1/133605 349/64 |

(Continued)

FOREIGN PATENT DOCUMENTS

| | | |
|---|---|---|
| JP | 2005-044744 A | 2/2005 |
| JP | 2006-208534 A | 8/2006 |

(Continued)

OTHER PUBLICATIONS

Korean Office Action dated Apr. 20, 2022 issued in Patent Application No. 10-2020-0147107 (6 pages).

(Continued)

*Primary Examiner* — Lucy P Chien
(74) *Attorney, Agent, or Firm* — POLSINELLI PC (57) ABSTRACT

An optical film according to various embodiments of the disclosure may include: a prism pattern layer having one surface on which a plurality of prisms having pattern directions parallel to each other in a first direction are provided; a first diffusion layer provided on the other surface of the prism pattern layer; a base film that is in contact with the first diffusion layer on one surface and has an optical axis direction in a second direction different from the first direction; and a second diffusion layer that is in contact with the other surface of the base film. In addition, an optical film and a backlight unit including the optical film according to various embodiments may be provided.

8 Claims, 9 Drawing Sheets

(56) References Cited

U.S. PATENT DOCUMENTS

| | | | |
|---|---|---|---|
| 2006/0164860 A1* | 7/2006 | Muraoka | G02F 1/133606 362/19 |
| 2006/0221273 A1* | 10/2006 | Ha | G02B 5/0242 349/65 |
| 2006/0268571 A1* | 11/2006 | Harada | G02B 6/0038 362/618 |
| 2008/0123192 A1 | 5/2008 | Lin | |
| 2009/0214828 A1* | 8/2009 | Watkins | G02B 6/0053 428/156 |
| 2010/0086743 A1 | 4/2010 | Wang et al. | |
| 2010/0271840 A1 | 10/2010 | Hamada et al. | |
| 2016/0054507 A1 | 2/2016 | Hirayama et al. | |
| 2017/0322348 A1* | 11/2017 | Shimamura | G02B 5/0278 |

FOREIGN PATENT DOCUMENTS

| | | |
|---|---|---|
| JP | 2009-026753 A | 2/2009 |
| JP | 2010-085845 A | 4/2010 |
| KR | 10-2004-0031858 A | 4/2004 |
| KR | 2007-0013677 A | 1/2007 |
| KR | 10-2009-0053278 A | 5/2009 |
| KR | 10-2012-0023299 A | 3/2012 |
| KR | 10-2013-0107645 A | 10/2013 |
| KR | 10-2016-0073759 A | 6/2016 |
| KR | 10-2020-0079011 A | 7/2020 |
| TW | 2007-32701 A | 9/2007 |
| TW | 200848800 A | 12/2008 |
| TW | 2010-015117 A | 4/2010 |
| WO | 2008-084744 A1 | 7/2008 |
| WO | 2014-157461 A1 | 10/2014 |

OTHER PUBLICATIONS

Taiwanese Office Action dated Aug. 26, 2022 issued in Patent Application No. 110140920 w/English Translation (14 pages).

Japanese Office Action dated Oct. 4, 2022 issued in Patent Application No. 2021-180619 w/English Translation (9 pages).

Chinese Office Action dated Oct. 18. 2023 issued in Patent Application No. 202111291766.6 w/English Translation (14 pages).

* cited by examiner

OPTICAL FILM

CROSS-REFERENCE TO RELATED APPLICATION

This application is based on and claims priority under 35 U.S.C. 119 to Korean Patent Application No. 10-2020-0147107, filed on Nov. 5, 2020, in the Korean Intellectual Property Office, the disclosure of which is herein incorporated by reference in its entirety.

BACKGROUND

Field of the Disclosure

Various embodiments of the disclosure relate to an optical film used in a liquid crystal display device.

Description of the Background

In general, a liquid crystal display (LCD) device may include a backlight unit that uniformly illuminates the entire screen of an electronic device with light. The backlight unit may include a light source, a light guide plate, a diffusion sheet, and an optical film including a prism. The light emitted from the light source may be transmitted upward through the light guide plate, and the upwardly transmitted light may be diffused through the diffusion sheet and then transmitted to a liquid crystal panel through the optical film provided on the diffusion sheet. In some cases, the backlight unit may further include an additional diffusion sheet on the optical film. A general optical film can be configured to change a point light source of a light source to a plane light source by laminating a plurality of diffusing and condensing sheets.

Recently developed display devices have gradually become thinner, and accordingly, backlight units are also required to be manufactured thin. Developments are being performed to remove a relatively thick diffusion sheet from a backlight unit is in progress. For example, in an embodiment including a light source, a light guide plate, a lower diffusion sheet, an optical film, and an upper diffusion sheet as the backlight unit, the upper diffusion sheet may be removed.

However, when the upper diffusion sheet is removed to reduce the thickness of the backlight unit, a Newton's ring, which is an optical interference phenomenon caused by laminating a plurality of films on the exterior or a rainbow mura phenomenon in which a rainbow-shaped stains (color non-uniformity), occurs on a display surface of the electronic device may occur, and thus display quality may be deteriorated. Accordingly, it is necessary to develop a method capable of reducing the thickness of a backlight unit and preventing display quality from being deteriorated.

SUMMARY

Various embodiments of the disclosure are intended to provide an optical film for a liquid crystal display device that provides improved image quality.

For example, the disclosure is intended to provide an optical film capable of preventing an optical interference or color non-uniformity phenomenon.

According to various embodiments of the disclosure, it is possible to provide an optical film including: a prism pattern layer having one surface on which a plurality of prisms having pattern directions parallel to each other in a first direction are provided; a first diffusion layer provided on the other surface of the prism pattern layer; a base film that is in contact with the first diffusion layer on one surface and has an optical axis direction in a second direction different from the first direction; and a second diffusion layer that is in contact with the other surface of the base film.

According to various embodiments of the disclosure, it is possible to contribute to the reduction of the thickness of the backlight unit by not providing an upper diffusion sheet on the top surface of the optical film.

With the optical film according to various embodiments of the disclosure, it is possible to provide improved image quality by providing diffusion layers on the opposite surfaces of the base film to prevent a light interference or color non-uniformity phenomenon, even without the upper diffusion sheet.

With the optical film according to various embodiments of the disclosure, it is possible to provide improved image quality by making the pattern direction of the prism pattern layer and the optical axis direction of the base film have a difference of a predetermined angle or more therebetween to prevent an optical interference or color non-uniformity phenomenon.

With the optical film according to various embodiments of the disclosure, it is possible to provide improved image quality by making respective elements of the optical film have different refractive indices to prevent a light interference or color non-uniformity phenomenon.

Effects that can be obtained in the disclosure are not limited to those described above, and other effects not described above will be clearly understood by a person ordinarily skilled in the art to which the disclosure belongs based on the following description.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION

It should be understood that various embodiments disclosed herein and terms for describing the embodiments are not intended to limit the technical features disclosed herein to specific embodiments, and that the embodiments include various modifications, equivalents, and/or substitutions of the corresponding embodiments. In connection with the description of the drawings, similar or related components may be denoted by similar reference numerals. The singular form of a noun corresponding to an item may include one or more of the items unless the context clearly indicates otherwise.

According to various embodiments, each (e.g., a module or a program) of the above-described components may include a singular entity or plural entities, and some of the plural entities may be separately disposed on different components. According to various embodiments, one or more of the components or operations described above may be omitted, or one or more other components or operations may be added. Alternatively or additionally, a plurality of components (e.g., modules or programs) may be integrated into one component. In such a case, an integrated component may perform one or more functions of each of the plurality of components in the same or similar manner as when performed by the corresponding one of the plurality of components prior to the integration. According to various embodiments, operations performed by a module, a program, or other components may be performed sequentially, in parallel, repetitively, or heuristically, one or more of the operations may be performed in a different order or omitted, or one or more other operations may be added thereto.

Various embodiments will be described with reference to the accompanying drawings. In describing the embodiments, the same term and the same reference numeral will be used for the similar component, and an additional description thereof will be omitted. In addition, in describing the embodiments of the disclosure, the same term and the same reference numeral are used for components having the same function, but it does not mean that the components are substantially completely the same as the preceding ones.

According to various embodiment, it should be understood that terms, such as "comprise" and "have", are used to specify the presence of described features, numbers, steps, operations, components, parts, or combinations thereof, but are not intended to preclude in advance the presence or addition of one or more other features, numbers, steps, operations, components, parts, or combinations thereof.

Figure 1:
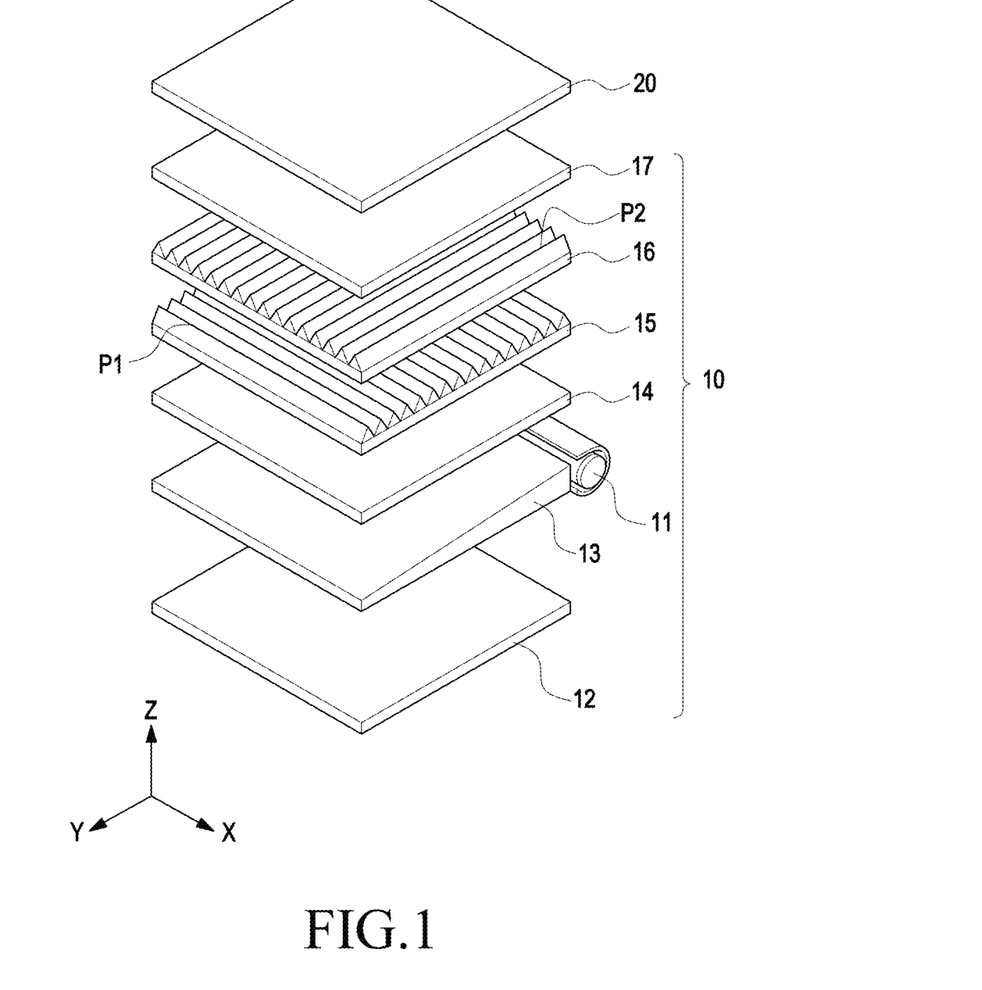
FIG. 1 is an exploded perspective view of a liquid crystal display device according to some embodiments.

FIG. 1 is an exploded perspective view of a liquid crystal display device 1 according to some embodiments.

Referring to FIG. 1, the liquid crystal display (LCD) device 1 may include a backlight unit 10 and a liquid crystal panel 20. According to various embodiments, the backlight unit 10 may be disposed to face the rear surface (the surface oriented in the −Z direction) of the liquid crystal panel 20 to irradiate the liquid crystal panel 20 with light. The backlight unit 10 may include a light source 11, a reflective plate 12, a light guide plate 13, diffusion sheets 14 and 17, and prism sheets 15 and 16. According to an embodiment, although not shown in the drawings, the backlight unit 10 may further include a reflective polarizing sheet.

The light source 11 is a component to emit light to the rear surface of the liquid crystal panel 20, and the light emitted from the light source 11 may be converted into a plane light source by the light guide plate 13. The light source 11 may be classified into an edge type or a direct type depending on an arrangement structure. The direct type can be divisionally driven compared to the edge type, thereby implementing an image more delicately than the edge type. According to an embodiment, the light source 11 may be one of a cold cathode fluorescent lamp (CCFL), an external electrode fluorescent lamp, and a light emitting-diode (LED) (hereinafter, referred to as an "LED").

The reflective plate 12 is disposed behind the light guide plate 13 and is capable of minimizing light loss by reflecting the light, which is emitted toward the rear side of the light guide plate 13 (the surface oriented in the −Z axis direction), toward the light guide plate 130 to be incident on the same.

The diffusion sheets 14 and 17 are capable of uniformly diffusing the light incident from the light guide plate 13. The diffusion sheets 14 and 17 may be coated with a solution of a curable resin (e.g., at least one selected from urethane acrylate, epoxy acrylate, ester acrylate, ester acrylate, and radical generating monomer to be used alone or in combination), to which light diffusing agent beads are added, to cause light diffusion by the light diffusing agent beads. In addition, the diffusion sheets 14 and 17 may include protrusion patterns (or protrusions), which are uniform or non-uniform in size or shape (e.g., a spherical shape) to promote light diffusion.

The diffusion sheets 14 and 17 may include a lower diffusion sheet 14 and an upper diffusion sheet 17. The lower diffusion sheet 14 may be disposed between the light guide plate 13 and the prism sheet 15, and the upper diffusion sheet 17 may be disposed between the prism sheet 16 and the liquid crystal panel 20. When the backlight unit 10 further includes a reflective polarizing sheet, the upper diffusion sheet 17 may be disposed between the prism sheet 16 and the reflective polarizing sheet.

The prism sheets 15 and 16 may condense incident light using the optical patterns provided on the surfaces thereof and may then emit the light to the liquid crystal panel 20. The prism sheets 15 and 16 may each include a light-transmissive base film and a prism pattern layer provided on the top surface (the surface oriented in the +Z-axis direction) of the base film. The prism pattern layer may be configured as an optical pattern layer in the form of a triangular array in which an inclined surface having a predetermined angle (e.g., an inclined surface of 45 degrees) is provided in order to improve luminance in the plane direction. The prism patterns of the prism pattern layer may have a triangular prism shape, and one surface of the triangular prism may be disposed to face the base film.

According to an embodiment, the prism sheets 15 and 16 may include a first prism sheet 15 and a second prism sheet 16 to configure a composite prism sheet structure. Here, the second prism sheet 16 may be disposed to overlap the top surface of the first prism sheet 15. In the first prism sheet 15, the plurality of first prism patterns may be arranged parallel to each other. Each of the first prism patterns may have a structure extending in one direction. For example, the vertex lines P1 of respective first prism patterns may be disposed to extend in the X-axis direction. Similarly, in the second prism sheet 16, the plurality of second prism patterns may also be arranged parallel to each other. Each of the second prism patterns may have a structure extending in one direction. For example, the vertex lines P2 of respective second prism patterns may be disposed to extend in the Y-axis direction. Here, the first prism patterns and the second prism patterns are illustrated as extending in the X-axis direction and the Y-axis direction, respectively, for convenience of description. However, the prism patterns are not limited to the illustrated embodiment and may extend in a direction other than the X-axis direction or the Y-axis direction.

A reflective polarizing sheet (not illustrated) may be provided above the prism sheets 15 and 16 and the upper diffusion sheet 17 to play a role of transmitting some polarized light, which has been condensed from the prism sheets 15 and 16 and diffused by the upper diffusion sheet 17 and reflecting the remaining polarized light downward.

The liquid crystal panel 20 may refract the light emitted from the light source 11 in a predetermined pattern according to an electrical signal. The refracted light may pass through a color filter and a polarizing filter disposed on the front surface of the liquid crystal panel 20 to form a screen.

Figure 2:
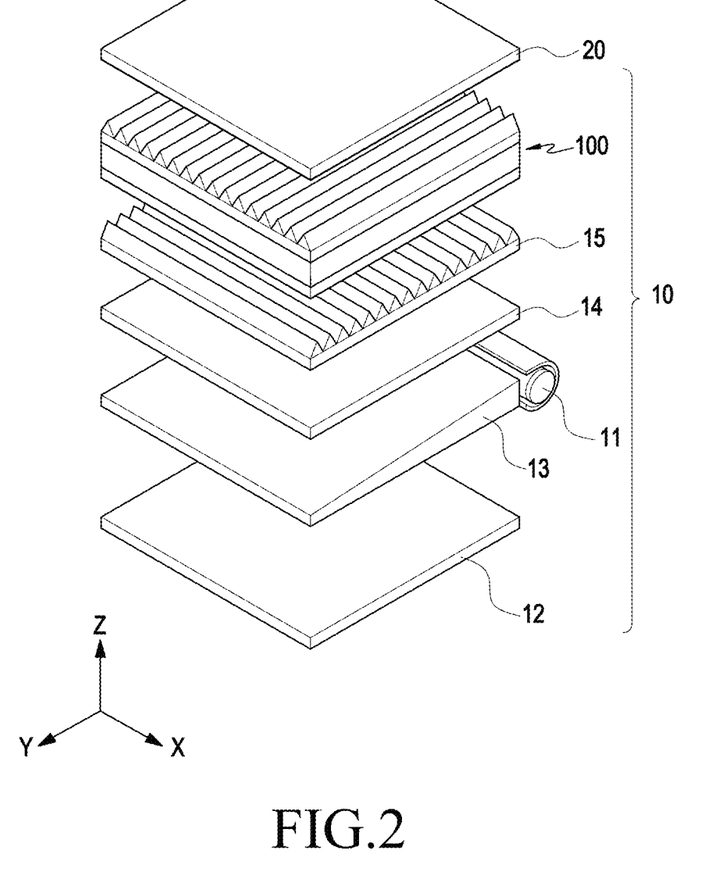
FIG. 2 is an exploded perspective view of a liquid crystal device to which an optical film is applied according to an embodiment of the disclosure.

FIG. 2 is an exploded perspective view of a liquid crystal display device 1 to which an optical film 100 is applied, according to an embodiment of the disclosure.

Referring to FIG. 2, the liquid crystal display device (or an LCD device) 1 according to an embodiment of the disclosure includes a backlight unit 10 and a liquid crystal panel 20, wherein the backlight unit 10 may include a light source 11, a reflective plate 12, a light guide plate 13, a lower diffusion sheet 14, and a prism sheet 15. Although not illustrated in the drawings, the backlight unit 10 may further include a reflective polarizing sheet. Hereinafter, descriptions of parts overlapping those of FIG. 1 will be omitted. The liquid crystal display device 1 of the disclosure may be characterized by being provided with the optical film 100 of the disclosure without including the upper diffusion sheet 17 of FIG. 1.

In the disclosure, the term "optical film" may refer to a film further including a light diffusion layer on the prism sheet and the light-transmissive base film. In the drawing of FIG. 2, although exaggerated a little for convenience of description, the light diffusion layer included in the optical film 100 (e.g., the first diffusion layer 120 and/or the second diffusion layer 140 to be described later with reference to FIG. 3) may have a very small thickness (e.g., 1 to 10 μm in thickness of the light diffusion layer) compared with the thickness of the upper diffusion sheet 17 (e.g., 50 to 200 μm). The optical film 100 may include a plurality of light diffusion layers (e.g., the first diffusion layer 120 and the second diffusion layer 140 to be described later with reference to FIG. 3). Even if the plurality of light diffusion layers are provided, the liquid crystal display device 1 of FIG. 2 may be thinner than the liquid crystal display device 1 of FIG. 1 provided with the upper diffusion sheet 17 since the light diffusion layers (e.g., the first diffusion layer 120 and the second diffusion layer 140 to be described later with reference to FIG. 3) included in the optical film 100 are made thinner compared with the diffusion sheet.

The liquid crystal display device 1 according to various embodiments of the disclosure may not include the upper diffusion sheet 17 of FIG. 1, and any one of the prism sheets 15 and 16 may be replaced with the optical film 100 that is provided with a plurality of light diffusion layers. According to an embodiment, the second prism sheet 16 of FIG. 1 may be replaced with the optical film 100. The optical film 100 according to various embodiments of the disclosure may not include the upper diffusion sheet 17 of FIG. 1, and the second prism sheet 16 adjacent to the existing upper diffusion sheet 17 may be replaced with the optical film 100 including the plurality of light diffusion layers 120 and 140.

Figure 3:
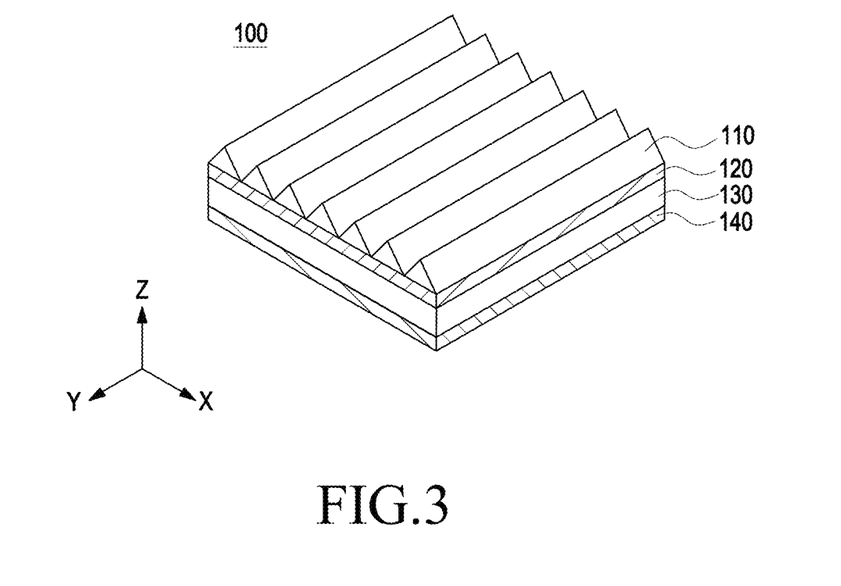
FIG. 3 is a perspective view illustrating an optical film according to an embodiment of the disclosure.
Figure 4:
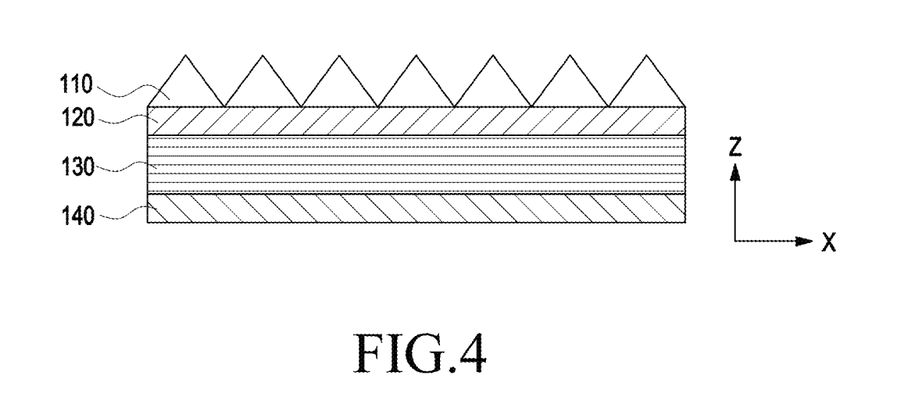
FIG. 4 is a cross-sectional view illustrating the optical film according to an embodiment of the disclosure.

FIG. 3 is a perspective view illustrating the optical film 100 according to an embodiment of the disclosure. FIG. 4 is a cross-sectional view illustrating the optical film 100 according to an embodiment of the disclosure.

The optical film 100 according to an embodiment of the disclosure may include a prism pattern layer 110, a first diffusion layer 120, a base film 130, and a second diffusion layer 140.

A plurality of prism patterns having parallel pattern directions in the first direction (e.g., the Y direction) may be provided on one surface of the prism pattern layer 110. The prism patterns may be a triangular shape in cross section. A first diffusion layer 120 is provided on the other surface of the prism pattern layer. The first diffusion layer 120 may be provided on the surface opposite to the surface on which the prism patterns of the prism pattern layer are provided, and a base film 130 may be disposed on the other surface of the first diffusion layer 120. The prism pattern layer 110, the first diffusion layer 120, the base film 130, and the second diffusion layer 140 may be bonded to each other by an adhesive. Here, the adhesive may be an adhesive containing an acrylic or polyester-based polymer. In addition, the adhesive may be a pressure-sensitive adhesive (PSA). However, it should be noted that the disclosure is not limited to the above-mentioned examples of adhesives.

The base film 130 is configured to support the first diffusion layer 120 and the prism pattern layer 110. For example, the base film 130 may include a transparent material that can transmit light, for example, a polycarbonate-based material, a polysulfone-based material, a polyacrylate-based material, a polystyrene-based material, a polyvinyl chloride-based material, a polyvinyl alcohol-based material, a polynorbornene-based material, or a polyester-based material. As a specific example, the base film 130 may be made of polyethylene terephthalate, polyethylene naphthalate, or the like. As will be described in detail below with reference to FIG. 5, the base film 130 may have an optical axis direction in a second direction different from the first direction (e.g., Y axis) that is a pattern direction of the prism pattern layer 110. In addition, the second diffusion layer 140 may be provided on the other surface of the base film 130.

The thickness of the base film 130 may be, for example, about 10 to about 500 and more specifically, about 50 to about 300 Of course, the thickness of the base film 130 is not limited to the above examples.

With reference to the base film 130, one surface and the other surface, namely, the opposite surfaces of the optical film 100 according to the disclosure are provided with light diffusion layers 120 and 140, respectively, so that a light diffusion effect and the effects of reducing a light interference phenomenon and a color non-uniformity phenomenon can be increased.

Regarding the light diffusion effect, the prism pattern layer 110 and the base film 130 may have a high refractive index, and the first diffusion layer 120 and the second diffusion layer 140 may be provided to have a relatively low refractive index compared to the prism pattern layer 110 and the base film 130.

The following is a table showing refractive indices of respective layers constituting the optical film 100.

TABLE 1

| Layer classification | Refractive Index |
|---|---|
| Prism pattern layer 110 | 1.56 to 1.70 |
| 1$^{st}$ diffusion layer 120 | 1.40 to 1.55 |
| Base film 130 | 1.56 to 1.70 |
| 2$^{nd}$ diffusion layer 140 | 1.40 to 1.55 |

For example, as shown in Table 1, when a refractive index in a vacuum state is 1, each of the prism pattern layer 110 and the base film 130 may have a refractive index of 1.56 to 1.70, and each of the first diffusion layer 120 and the second diffusion layer 140 may have a refractive index of 1.40 to 1.55. Here, there may be a refractive index difference of 0.01 to 0.3 between the refractive indices of the prism pattern layer 110 and the base film 130 and the refractive indices of the first diffusion layer 120 and the second diffusion layer 140.

The following is a table showing various examples of refractive indices of the layers constituting the optical film 100 and diffusion effects obtained thereby.

TABLE 2

| Classification | | $1^{st}$ embodiment | $2^{nd}$ embodiment | $3^{rd}$ embodiment | $4^{th}$ embodiment |
|---|---|---|---|---|---|
| Refractive index | Prism pattern layer 110 | 1.6 | 1.6 | 1.65 | 1.65 |
| | $1^{st}$ diffusion layer 120 | 1.5 | 1.5 | 1.5 | 1.5 |
| | Base film 130 | 1.6 | 1.6 | 1.6 | 1.6 |
| | $2^{nd}$ diffusion layer 140 | — | 1.5 | — | 1.5 |
| Newton's ring | | Exist | Not exist | Exist | Not exist |
| Rainbow mura | | Exist | Not exist | Exist | Not exist |
| Light diffusivity | | 103% | 100% | 105% | 102% |

For example, comparing the first embodiment and the second embodiment of Table 2 above, when only the first diffusion layer 120 is provided between the prism pattern 110 and the base film 130 as a diffusion layer provided in the optical layer 100 that does not include the upper diffusion layer, the light incident through the bottom surface of the base film 130 is emitted after sequentially passing through the high refractive index member, the low refractive index member, and the high refractive index member. When only the first diffusion layer 120 is provided in the optical film 100 as described above, the Newton's ring and the rainbow mura phenomenon may be observed. In contrast, when the second diffusion layer 140 is further included in the optical film 100, it is possible to prevent the Newton's ring and the rainbow mura phenomenon. That is, when the optical film 100 further includes the second diffusion layer 140 as well as the first diffusion layer 120, it is possible to obtain a significantly great optical effect.

Further referring to the third and fourth embodiments of Table 2, compared to the third embodiment, in the case of the fourth embodiment, by further including the second diffusion layer 140 having a relatively low refractive index compared to those of other media of the layers of the optical film 100, it is possible to further reduce the light diffusivity, and thus it is possible to obtain an effect of reducing the light interference phenomenon caused due to light diffusion. For example, the light incident through the bottom surface of the second diffusion layer 140 is emitted after sequentially passing through the low refractive index member, the high refractive index member, the low refractive index member, and the high refractive index member. According to an embodiment, the disclosure is advantageous in that light diffusivity can be more precisely controlled since dual paths through which light is diffused while sequentially passing through a low refractive index medium and a high refractive index medium are provided by further including the second diffusion layer 140. In the first diffusion layer 120 and the second diffusion layer 140, light diffusion may be caused by adding light diffusing agent beads to a solution of a curable resin (e.g., at least one selected from urethane acrylate, epoxy acrylate, ester acrylate, ester acrylate, and a radical generating monomer to be used alone or in combination).

In addition, in connection with the effect of reducing the light interference phenomenon and the color non-uniformity phenomenon, the first diffusion layer 120 and the second diffusion layer 140 may be haze-treated. Here, the term "haze treatment" may include all treatment methods for increasing turbidity including matte treatment that increases turbidity by roughening the surfaces of the first diffusion layer 120 and the second diffusion layer 140 and bead treatment that increases turbidity using beads of, for example, glass, polymer, etc. By haze-treating the first diffusion layer 120 and the second diffusion layer 140, it is possible to reduce the light interference phenomenon or the color non-uniformity phenomenon caused by not including the upper diffusion sheet 17 of FIG. 1. For example, in the case in which only the haze-treated first diffusion layer 120 is provided between the prism pattern layer 110 and the base film 130 as a diffusion layer provided in the optical film, light incident through the bottom surface of the base film 130 is emitted after sequentially passing through the base film 130, the first diffusion layer 120, and the prism pattern layer 110. However, the optical film may not have a desired value of turbidity for the emitted light due to the difference in refractive indices of respective members thereof. For example, in the case of an optical film including only the first diffusion layer 120 haze-treated to have a turbidity of 60% to 90% may have a turbidity of 30% to 45% for the light emitted from the prism pattern layer 110. In order to compensate for this phenomenon, both of the first diffusion layer 120 and the second diffusion layer 140 of the optical film 100 of the disclosure may be haze-treated. For example, the first diffusion layer 120 may be haze-treated to have a turbidity of 50% to 90%, and the second diffusion layer 140 may be haze-treated to have a turbidity of 5% to 40%. The effect of reducing the optical interference phenomenon and the color non-uniformity phenomenon that is obtained by further including the haze-treated second diffusion layer 140 together with the first diffusion layer 120 may be significantly greater than that obtained when only the haze-treated first diffusion layer 120 is provided as described above.

Figure 5:
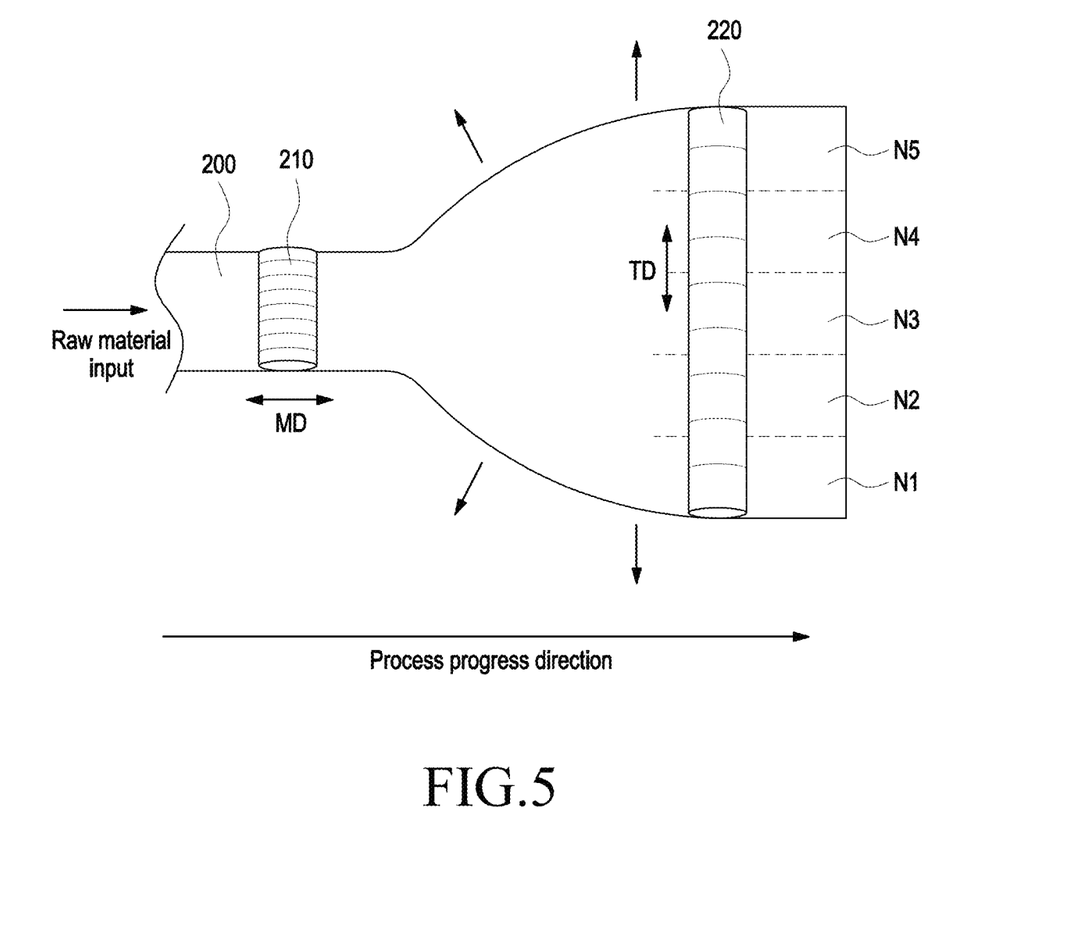
FIG. 5 is a conceptual view illustrating a state in which a base film preform is stretched.

FIG. 5 is a conceptual view illustrating a state in which a base film preform 200 is stretched.

Referring to FIG. 5, in a state in which the base film preform 200 is stretched in one direction to provide a base film (e.g., the base film 130 in FIG. 3), the base film preform 200 may be slit into a plurality of base film pieces. For example, by cutting the base film preform 200 in a direction parallel to a process progress direction (e.g., a film moving direction MD below) to make a plurality of film pieces N1, N2, N3, N4, and N5. However, the plurality of pieces of film in FIG. 5 are only an example, and by using one base film preform 200, a larger number of pieces of film or a smaller number of pieces of film may be manufactured.

According to various embodiments, the base material preform 200 may be provided in the form of a roll.

In the disclosure, the term "stretching" may mean stretching an unstretched base material preform 200 in one direction (e.g., the film moving direction MD).

According to various embodiments, the base film preform 200 may have anisotropy through a biaxial stretching process.

Here, the term "biaxial stretching" may mean stretching an unstretched base film preform 200 in two different directions (e.g., the film moving direction MD and the film width direction TD).

As the base film preform 200 is stretched in two different directions (e.g., MD and TD), the molecular arrangement direction inside the base film may be changed. According to an embodiment, in the process of being stretched in the process progress direction, the base film preform 200 may receive a force in the directions indicated by arrows in FIG. 5 and may be stretched in the film moving direction as well as in the film width direction. According to various embodiments, such a biaxial stretching process may be implemented using a plurality of roll machines 210 and 220.

The base film preform 200 becomes anisotropic in the process of being widened and elongated through the biaxial stretching process and may have a molecular arrangement direction exhibiting double refraction in which the refractive index changes depending on the propagation direction of light.

Figure 6:
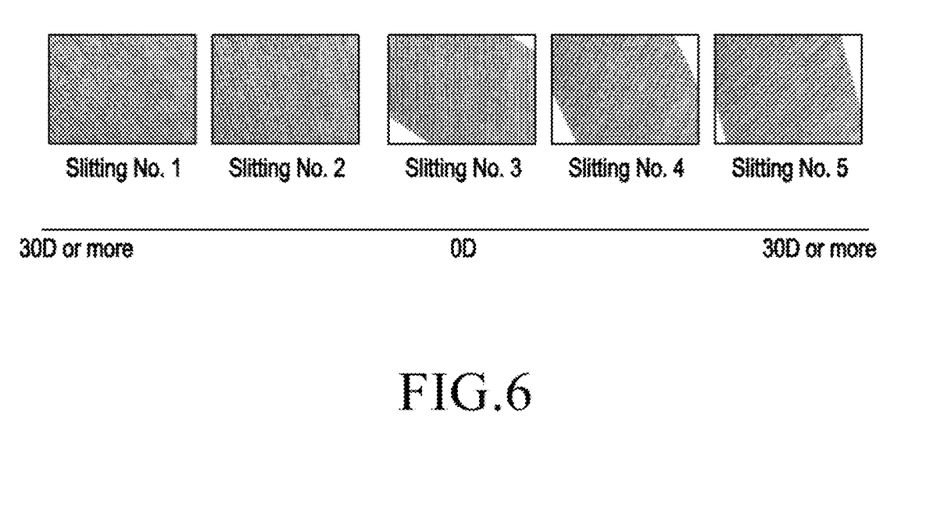
FIG. 6 is a conceptual view illustrating a state in which a stretched base film preform is slit into a plurality of base films.
Figure 7:
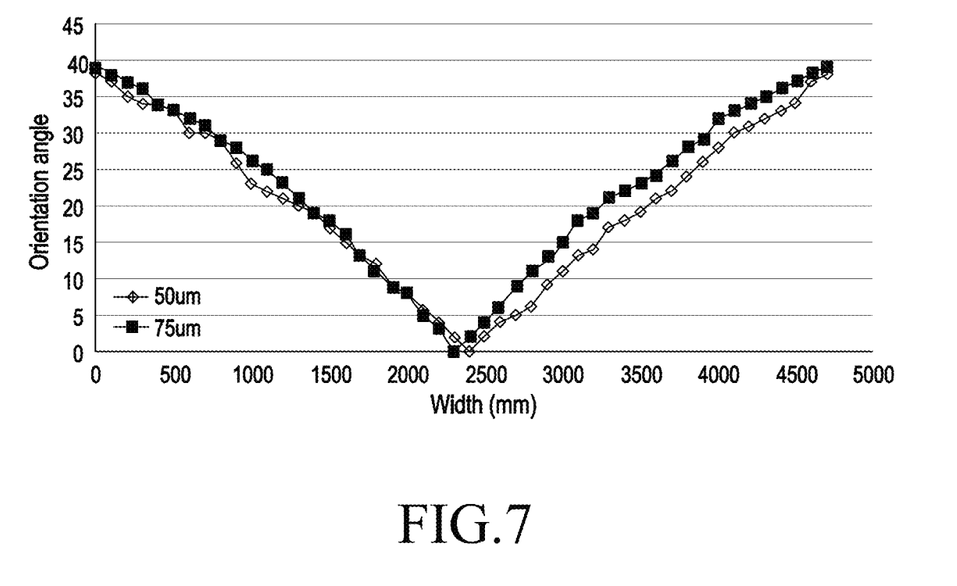
FIG. 7 is a view showing an optical axis orientation angle according to a width of a stretched base film preform.

FIG. 6 is a conceptual view illustrating a state in which a stretched base film preform is slit into a plurality of base films. FIG. 7 is a view showing an optical axis orientation angle according to a width of a stretched base film preform.

Referring to FIG. 6, when the base film preform is biaxially stretched, the molecular arrangement direction (the orientation angle) may vary along the moving direction and the width direction of the base film preform. For example, the molecular arrangement direction in the central piece N3 (Slitting No. 3) among a plurality of pieces (e.g., N1, N2, N3, N4, and N5 in FIG. 5) of the base film preform may be provided substantially parallel to the film moving direction. In addition, the molecular arrangement direction in each of the pieces N2 (Slitting No. 2) and N4 (Slitting No. 4) adjacent to the piece N3 (Slitting No. 3) located in the center among the plurality of pieces (e.g., N1, N2, N3, N4, and N5 in FIG. 5) of the base film preform may be provided to have an angle greater than 0 degrees from the film moving direction. Furthermore, the molecular arrangement direction in each of the outermost pieces N1 and N5 (Slitting Nos. 1 and 5) among the plurality of pieces of the base film preform (e.g., N1, N2, N3, N4, and N5 in FIG. 5) may be provided to have a greater intersection angle with the film moving direction compared to that in each of the pieces N2 and N4 (Slitting Nos. 2 and 4).

Referring to FIG. 7, it can be seen that, in the width direction of a base film preform, the molecular arrangement direction (the orientation angle) changes more and more from the center toward the outermost portions of the base film preform. For example, in an embodiment of stretching two base film preforms having different thicknesses (e.g., 50 μm and 75 μm), it can be seen that both of the base films become anisotropic through the biaxial stretching process and the molecular arrangement direction (the orientation angle) changes more and more from the center toward the outermost portions of each of the base film preforms. The molecular arrangement direction (the orientation angle) may generally increase linearly in the width direction.

For example, referring to FIGS. 6 and 7 together, among the plurality of slit pieces (e.g., N1, N2, N3, N4, and N5 in FIG. 5) of base film preform, the orientation angle in the piece N3 (Slitting No. 3) located in the center may be about 0 degrees, the orientation angles in the pieces N2 and N4 (Slitting No. 2 and Slitting No. 4) adjacent to the piece N3 may be greater than about 0 degrees and smaller than 30 degrees, and the orientation angle in the outermost pieces N1 and N5 (Slitting No. 1 and Slitting No. 5) may be 30 degrees or more. When light is incident on the pieces of the base film, the propagation direction of the light may be changed corresponding to the different orientation angles. That is, in the disclosure, when the orientation angle changes, it may mean that the propagation direction of light (hereinafter, referred to as an "optical axis direction") varies.

The optical film 100 according to various embodiments of the disclosure may include a base film 130, wherein it is intended to reduce an optical interference phenomenon and a color non-uniformity phenomenon by making the optical axis direction (e.g., the second direction) of the base film 130 intersect the pattern direction (e.g., the first direction) of the prism pattern layer 110 at a predetermined angle or more.

Figure 8:
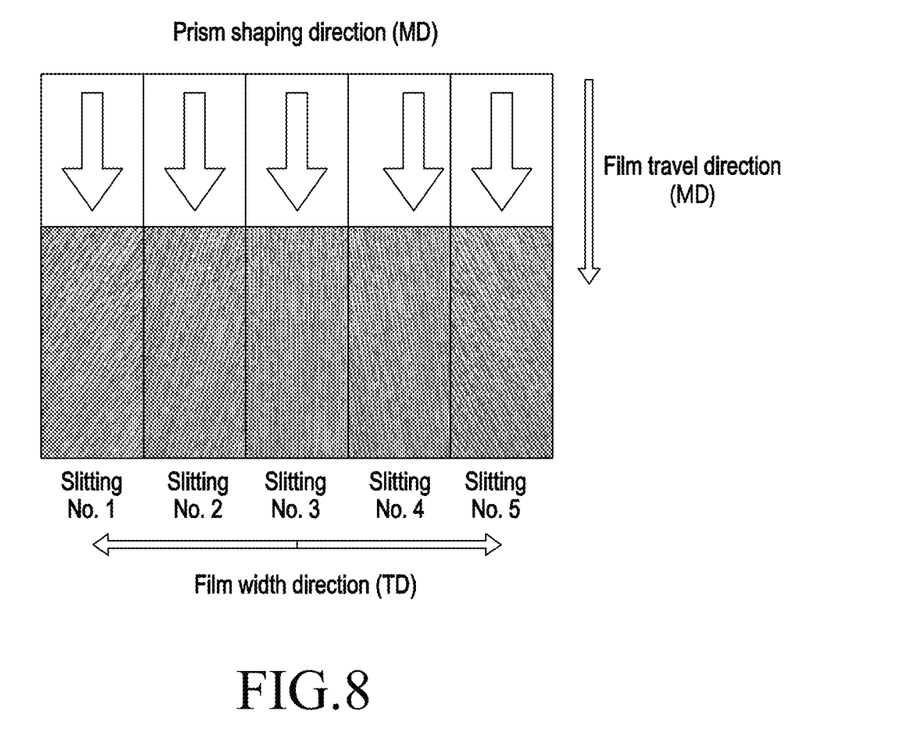
FIG. 8 is a view illustrating a state in which prisms are formed on a plurality of slit base films according to some embodiments.

FIG. 8 is a view illustrating a state in which prisms are formed on a plurality of slit base films according to some embodiments.

Referring to FIG. 8, as a comparative example, it may be illustrated that prisms are shaped on five pieces (e.g., N1, N2, N3, N4, and N5 in FIG. 5), which are arranged in the width direction (TD) of the biaxially stretched base film preform, in a direction parallel to the film moving direction (the direction indicated by arrows in FIG. 8). Here, the prism forming direction PD may mean a pattern direction of a prism pattern.

In this case, among a plurality of slit pieces of the base film preform (e.g., N1, N2, N3, N4, N5 in FIG. 5), the orientation angle of the piece N3 (Slitting No. 3) located in the center may be about 0 degrees, and the optical axis direction (the second direction) of a base film manufactured using this piece may be substantially parallel to the pattern direction (the first direction) of the prism pattern. The orientation angle in the pieces N2 and N4 (Slitting No. 2 and Slitting No. 4) adjacent to the piece N3 is greater than about 0 degrees and less than 30 degrees, and the optical axis direction (the second direction) of the base films manufactured using these pieces may have an intersection angle greater than about 0 degrees and less than 30 degrees with the pattern direction (the first direction) of the prism pattern. In addition, the orientation angle in the outermost pieces N1 and N2 (Slitting No. 1 and Slitting No. 5) is about 30 degrees or more, and the optical axis direction (the second direction) of the base films manufactured using these pieces may have an intersection angle of about 30 degrees or more with the pattern direction (the first direction) of the prism pattern.

Figure 9:
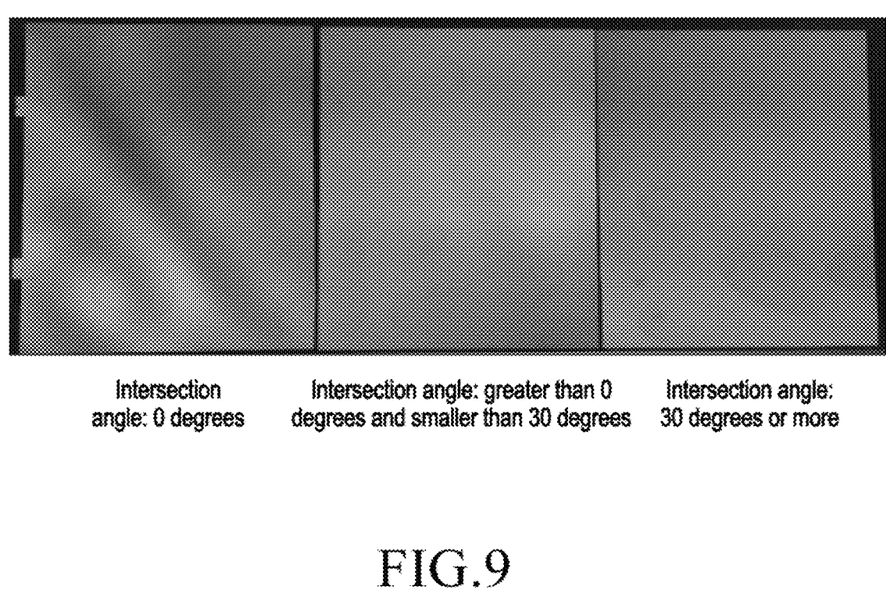
FIG. 9 is a view illustrating a color non-uniformity phenomenon of a liquid crystal panel according to an intersection angle between an optical axis direction of a base film and a pattern direction of a prism pattern layer.

FIG. 9 is a view illustrating a color non-uniformity phenomena of a liquid crystal panel according to an intersection angle between an optical axis direction of a base film and a pattern direction of a prism pattern layer.

The applicants measured rainbow mura in screens displayed on a liquid panel 20 by emitted light depending on an intersection angle of the optical axis direction (the second direction) of an upper base film and the pattern direction (the first direction) of a prism pattern were measured.

For example, as illustrated in FIG. 9, it can be seen that a rainbow stain (a stain due to the rainbow mura phenomenon) is remarkable in a screen displayed on the liquid crystal panel 20 in the embodiment in which the intersection angle between the optical axis direction (the second direction) of the base film and the pattern direction (the first direction) of the prism pattern is 0 degrees. It can be seen that, in the embodiment in which the intersection angle of the optical axis direction (the second direction) of the base film and the pattern direction (the first direction) of the prism pattern is greater than 0 degrees and less than 30 degrees, a rainbow stain in the screen displayed on the liquid crystal panel 20 is smaller than that in the embodiment in which the intersection angle is 0 degrees but is observed at least to an extent that is visually recognized. It can be seen that, in the embodiment in which the intersection angle between the optical axis direction (the second direction) of the base film and the pattern direction (the first direction) of the prism pattern is 30 degrees or more, a rainbow stain is not observed on the screen displayed on the liquid crystal panel 20.

Accordingly, referring back to FIG. 8, when optical films are manufactured by forming prism pattern layers using a plurality of pieces (e.g., N1, N2, N3, N4, and N5 in FIG. 5) provided through a biaxial stretching process as base films, rainbow stains may be observed in the optical films manufactured using the pieces N2, N3, and N4. That is, a rainbow stain may be observed for reasons for a process of manufacturing a base film, which may cause deterioration of product quality.

Figure 10:
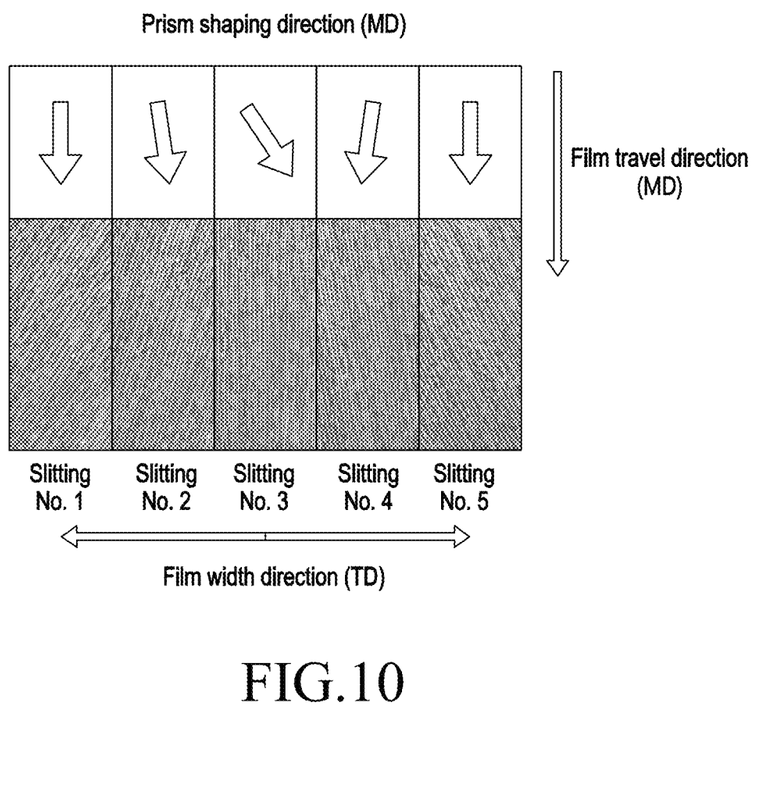
FIG. 10 is a view illustrating a state in which prisms are formed on a plurality of slit base films according to an embodiment of the disclosure.

FIG. 10 is a view illustrating a state in which prisms are formed on a plurality of slit base films according to an embodiment of the disclosure.

In order to minimize a color non-uniformity phenomenon, an optical film 100 according to various embodiments of the disclosure may include a base film that is configured such that the optical axis direction (the second direction) has an intersection angle, which is equal to or greater than a predetermined angle (e.g., 30 degrees or more), with the pattern direction (the first direction) of the prism pattern layer.

Referring to FIG. 10, prisms may be shaped on five pieces (e.g., N1, N2, N3, N4, and N5 in FIG. 5), which are arranged in the width direction (TD) of a biaxially stretched base film preform, to be oriented in different directions (e.g., the directions indicated by arrows in FIG. 10) on the five pieces, respectively, in consideration of the optical axis directions of the five pieces.

For example, the optical axis directions of a plurality of slit pieces (e.g., N1, N2, N3, N4, and N5 in FIG. 5) of a base film preform and the pattern directions of prism patterns shaped on the plurality of pieces (e.g., N1, N2, N3, N4, and N5 in FIG. 5) may all have an intersection angle of 30 degrees or more.

According to various embodiments of the disclosure, the prism pattern may be formed such that the intersection angle between the optical axis direction of the base film 130 and the pattern direction of the prism pattern is 30 degrees or more, whereby it is possible to significantly reduce a color non-uniformity (rainbow mura) phenomenon. In addition, according to various embodiments of the disclosure, it is possible to provide a method that is capable of reducing a color non-uniformity phenomenon for all of the plurality of biaxially stretched pieces (e.g., N1, N2, N3, N4, and N5 in FIG. 5).

Summarizing the above, the optical film 100 according to various embodiments of the disclosure does not include the upper diffusion sheet on the top surface thereof, thereby contributing to the reduction of the thickness of a backlight unit.

In addition, with the optical film 100 according to various embodiments of the disclosure, it is possible to provide improved image quality by providing the diffusion layers 120 and 140 on the opposite surfaces of the base film 130 to prevent a light interference or color non-uniformity phenomenon, even without the upper diffusion sheet.

Furthermore, with the optical film 100 according to various embodiments of the disclosure, it is possible to provide improved image quality by making the pattern direction (the first direction) of the prism pattern layer 110 and the optical axis direction (the second direction) of the base film 130 have a difference of a predetermined angle or more therebetween to prevent an optical interference or color non-uniformity phenomenon.

With the optical film according to various embodiments of the disclosure, it is possible to provide improved image quality by making respective elements of the optical film 100 (the prism pattern layer 110, first diffusion layer 120, the base film 130, and the second diffusion layer 140) have different refractive indices to prevent an optical interference or color non-uniformity phenomenon.

According to various embodiments of the disclosure, it is possible to provide an optical film (e.g., the optical film 100 in FIG. 3) including: a prism pattern layer (e.g., the prism pattern layer 110 in FIG. 3) having one surface on which a plurality of prisms having pattern directions parallel to each other in a first direction are provided; a first diffusion layer (e.g., the first diffusion layer 120 in FIG. 3) provided on the other surface of the prism pattern layer; a base film (e.g., the base film 130 in FIG. 3) that is in contact with the first diffusion layer on one surface thereof and has an optical axis direction in a second direction different from the first direction; and a second diffusion layer (e.g., the second diffusion layer 140 in FIG. 3) provided on other surface of the base film.

According to various embodiments, the first diffusion layer and the second diffusion layer may be haze-treated.

According to various embodiments, the first diffusion layer may be provided to have a turbidity of 60% to 90%, and the second diffusion layer may be haze-treated to have a turbidity of 5% to 25%.

According to various embodiments, the prism pattern layer and the base film may be provided to have a relatively high refractive index compared to the first diffusion layer and the second diffusion layer.

According to various embodiments, the prism pattern layer and the base film may be provided to have refractive indices of 1.56 to 1.70, and the first diffusion layer and the second diffusion layer may be provided to have refractive indices of 1.40 to 1.55.

According to various embodiments, there may be a refractive index difference of 0.01 to 0.3 between the refractive indices of the prism pattern layer and the base film and the refractive indices of the first diffusion layer and the second diffusion layer.

According to various embodiments, the first direction of the prism pattern layer may define an angle of at least 30 degrees with the second direction of the base film.

According to various embodiments of the disclosure, it is possible to provide a backlight unit including: a light source; a light guide plate configured to guide light emitted from the light source; a diffusion sheet configured to diffuse light passing through the light guide plate; a first prism sheet including a plurality of first prism patterns arranged parallel to each other in one direction and a light-transmissive base film configured to support the first prism patterns; and a second prism sheet including a plurality of second prism patterns arranged parallel to each other in a direction different from an arrangement direction of the first prism patterns and a light-transmissive base film configured to support the second prism patterns, wherein at least one of the prism sheet or the second prism sheet constitutes an optical film including a first diffusion layer and a second diffusion layer on opposite surfaces of the light-transmissive base film.

According to various embodiments, pattern directions of the prism patterns included in the optical film may have a predetermined angle difference relative to an optical axis direction of the base film.

It may be apparent to a person ordinarily skilled in the technical field to which the disclosure belongs that an optical film according to various embodiments and a backlight unit including the same are not limited by the above-described embodiments and drawings, and can be variously substituted, modified, and changed within the technical scope of the disclosure.

What is claimed is:

1. An optical film comprising:
   a prism pattern layer having one surface on which a plurality of prisms having pattern directions parallel to each other in a first direction are provided;
   a first diffusion layer provided on another surface of the prism pattern layer;
   a base film that is in contact with the first diffusion layer on one surface and has a molecular arrangement direction in a second direction different from the first direction; and
   a second diffusion layer provided on another surface of the base film,
   wherein the first direction of the prism pattern layer defines an angle of at least 30 degrees with the second direction of the base film, and
   wherein the base film has multiple molecular arrangement directions causing double refraction in which a refractive index changes depending on a propagation direction of light.

2. The optical film of claim 1, wherein the first diffusion layer and the second diffusion layer are haze-treated.

3. The optical film of claim 2, wherein the first diffusion layer is haze-treated to have a higher turbidity than the second diffusion layer.

4. The optical film of claim 1, wherein the first diffusion layer is provided to have a turbidity of 50% to 90%, and the second diffusion layer is haze-treated to have a turbidity of 5% to 40%.

5. The optical film of claim 1, wherein the prism pattern layer and the base film are provided to have a relatively high refractive index compared to the first diffusion layer and the second diffusion layer.

6. The optical film of claim 5, wherein the prism pattern layer and the base film are provided to have refractive indices of 1.56 to 1.70, and
   the first diffusion layer and the second diffusion layer are provided to have refractive indices of 1.40 to 1.55.

7. The optical film of claim 6, wherein there is a refractive index difference of 0.01 to 0.3 between the refractive indices of the prism pattern layer and the base film and the refractive indices of the first diffusion layer and the second diffusion layer.

8. A backlight unit comprising:
   a light source;
   a light guide plate configured to guide light emitted from the light source;
   a diffusion sheet configured to diffuse light passing through the light guide plate;
   a first prism sheet including a plurality of first prism patterns arranged parallel to each other in one direction and a light-transmissive base film configured to support the first prism patterns; and
   a second prism sheet laminated on the first prism sheet and including a plurality of second prism patterns arranged parallel to each other in a direction different from an arrangement direction of the first prism patterns and a light-transmissive base film configured to support the second prism patterns,
   wherein the second prism sheet constitutes an optical film including a first diffusion layer and a second diffusion layer on opposite surfaces of the light-transmissive base film,
   wherein pattern directions of the second prism patterns included in the optical film define an angle of at least 30 degrees with a molecular arrangement direction of the light-transmissive base film, and
   wherein the base film has multiple molecular arrangement directions causing double refraction in which a refractive index changes depending on a propagation direction of light.

* * * * *